No. 617,126. Patented Jan. 3, 1899.
J. F. ROTE.
FEED MECHANISM FOR VEGETABLE CUTTERS.
(Application filed July 24, 1897.)
(No Model.) 3 Sheets—Sheet 1.

Witnesses.
F. L. Ourand
George J. Weber

Inventor.
John F. Rote.
by
Attorney.

No. 617,126. J. F. ROTE. Patented Jan. 3, 1899.
FEED MECHANISM FOR VEGETABLE CUTTERS.
(Application filed July 24, 1897.)
(No Model.) 3 Sheets—Sheet 3.

Witnesses:
Alex Scott
Chas. H. Baker

Inventor.
John F. Rote

UNITED STATES PATENT OFFICE.

JOHN F. ROTE, OF READING, PENNSYLVANIA.

FEED MECHANISM FOR VEGETABLE-CUTTERS.

SPECIFICATION forming part of Letters Patent No. 617,126, dated January 3, 1899.

Application filed July 24, 1897. Serial No. 645,840. (No model.)

*To all whom it may concern:*

Be it known that I, JOHN F. ROTE, a citizen of the United States, residing at Reading, county of Berks, State of Pennsylvania, have invented certain Improvements in Feed Mechanism for Vegetable-Cutters, of which the following is a specification.

My invention relates to machines for cutting vegetables, &c.; and it consists particularly in an improved feed mechanism therefor which is adapted to automatically hold materials of varying sizes and shapes and to feed the same onward positively and uniformly without fear of injury to the operator.

In the accompanying drawings I have partially illustrated in connection with my improved feed mechanism a vegetable-cutter of the special form described and claimed in my pending application, Serial No. 595,379, filed June 13, 1896; but the said mechanism may be readily adapted to machines of different specific construction.

Figure 1:
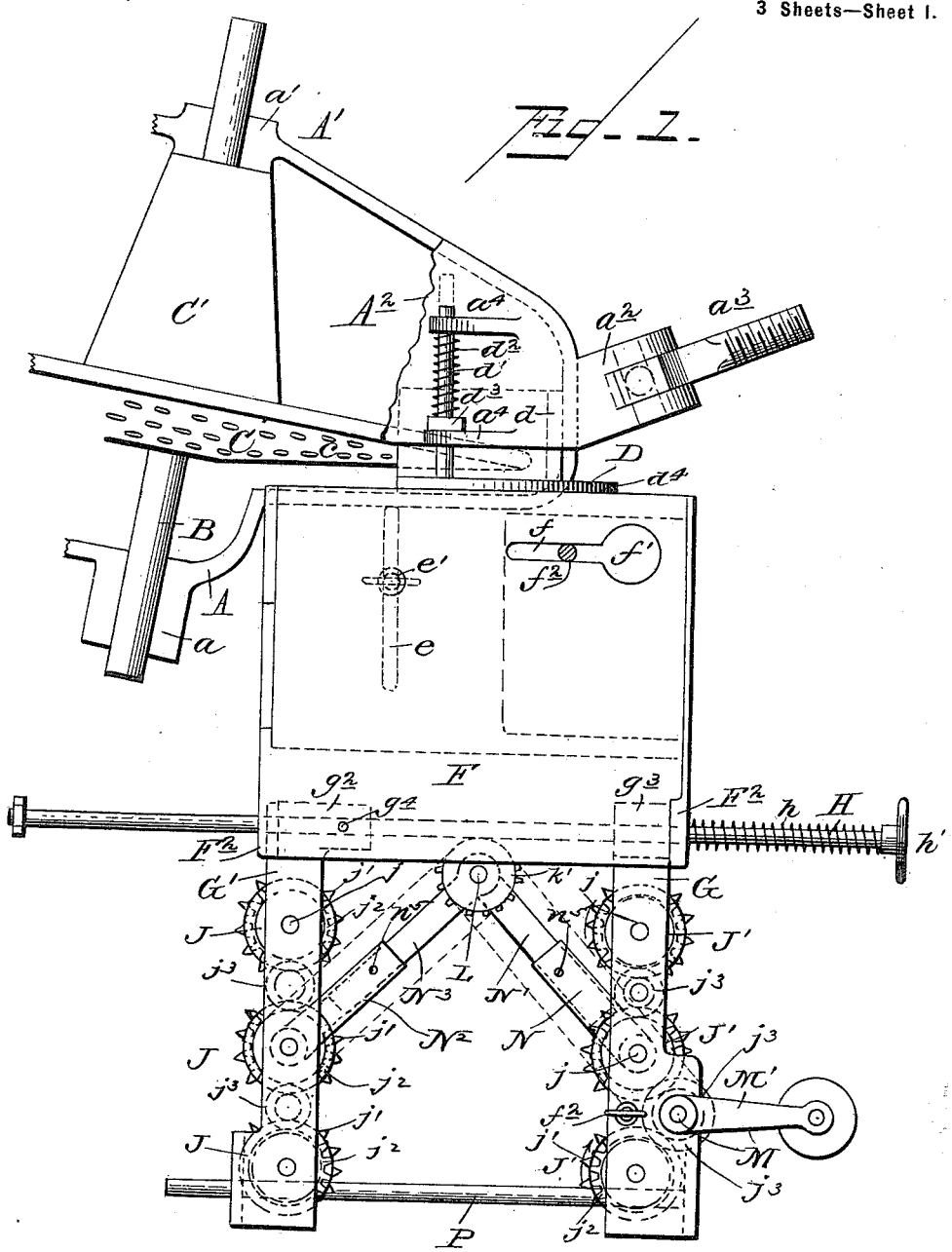
Figure 2:
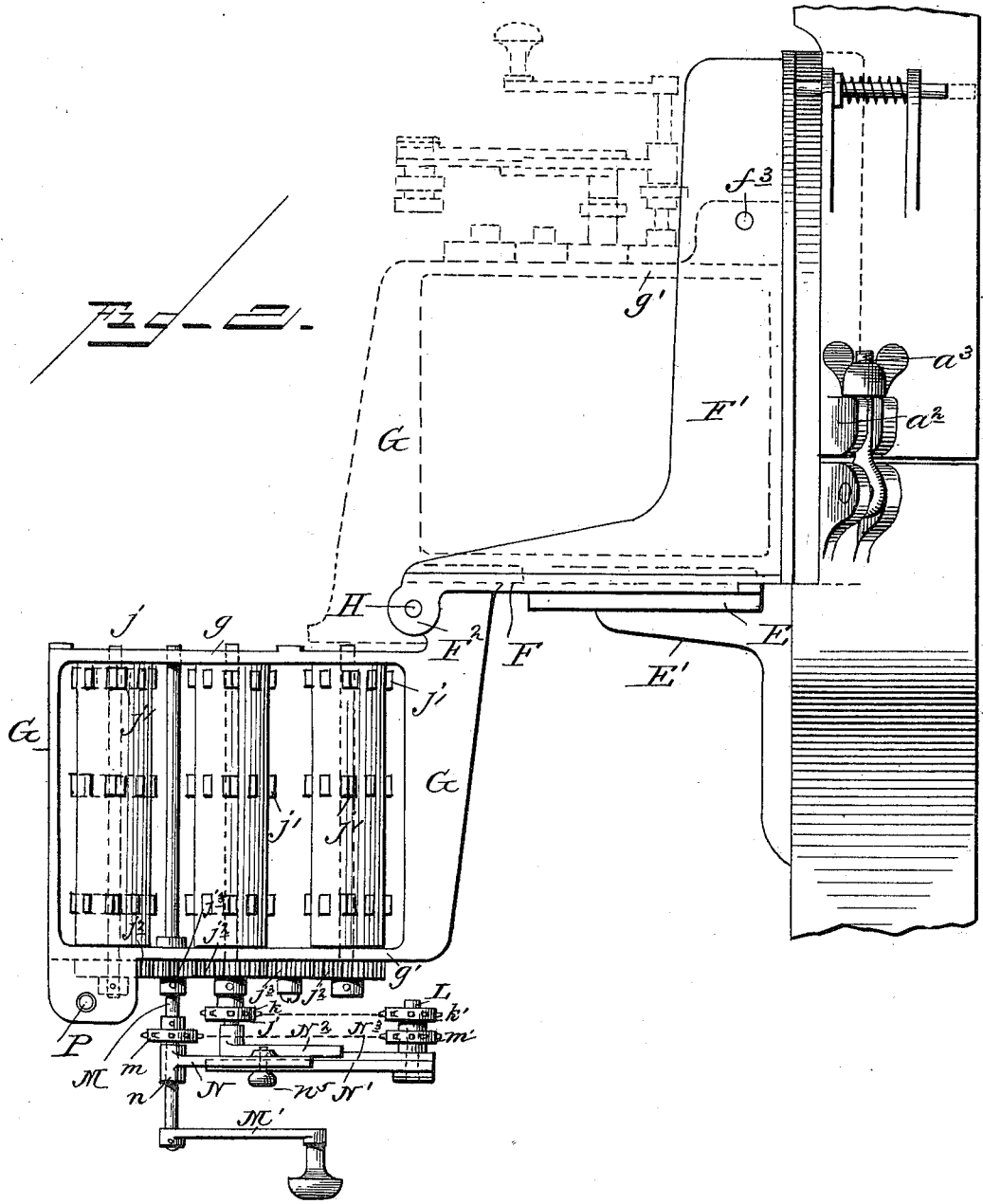
Figure 3:
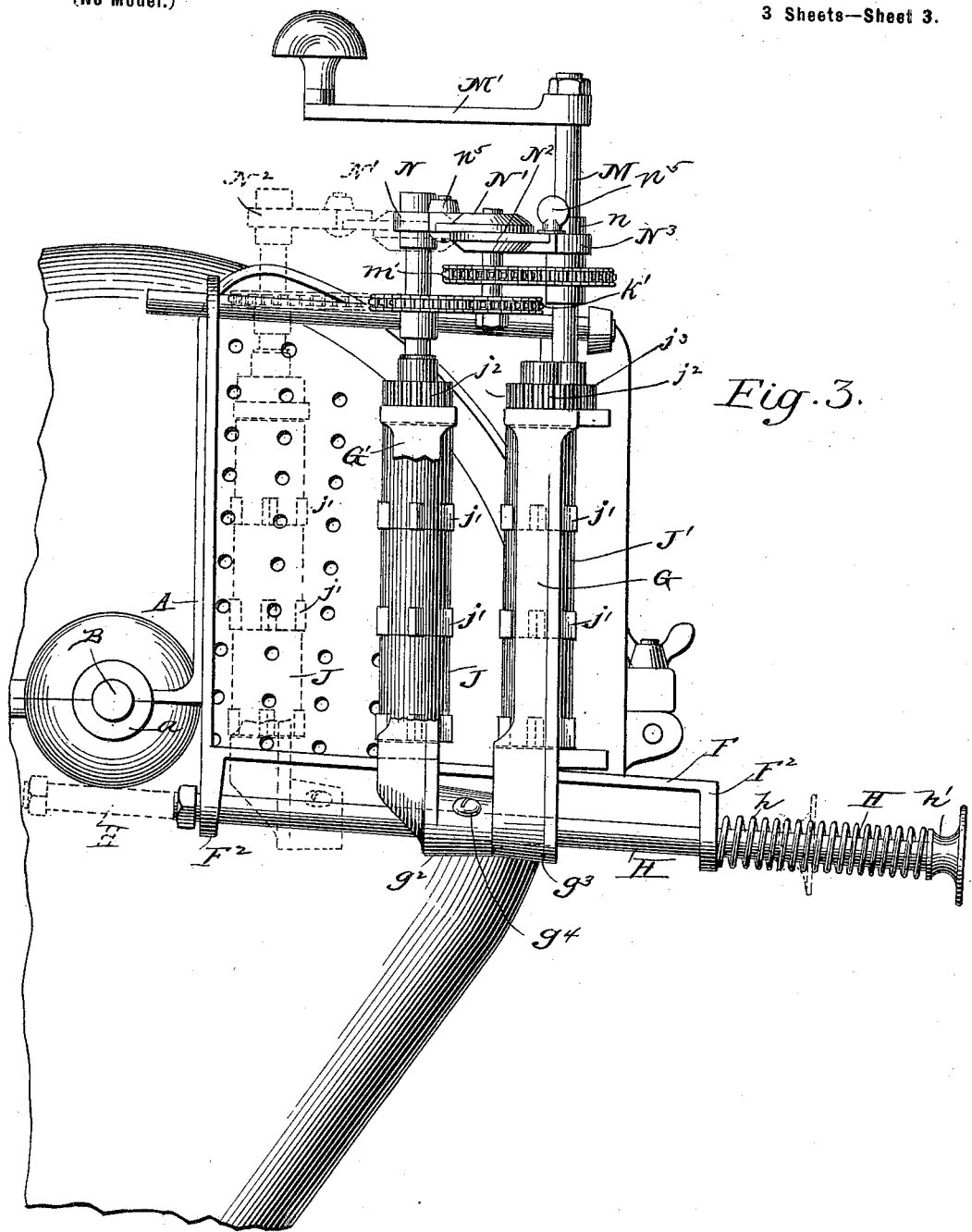

Figure 1 is a plan view showing a portion of the vegetable-cutting machine with my improved feed-table attached thereto and the feed mechanism pivoted to the table, the feed mechanism being shown as swung downward below the table in inoperative position. Fig. 2 is a side elevation showing the parts in the same position indicated in Fig. 1, but indicating also in dotted lines the feed mechanism swung up into operative position upon the table; and Fig. 3 is a front elevation of the device, showing the feed mechanism in operative position and with parts of the supporting-frames therefor removed, and also showing the feed-rollers close together in full lines and farther apart in dotted lines.

A A' represent a portion of the supporting-casing of a vegetable-cutting machine, having bearings $a$ $a'$, in which is mounted the horizontal shaft B of a cutter disk or wheel C, the latter, as shown, being provided with a tapering hub C' and a convex or bulging working face $c$, through which the cutter (not shown) is projected more or less in any suitable manner to operate upon the material presented to it, which latter is rested upon a feed-table supported upon a bracket E E' on the casing A. This table F is guided upon the bracket-shelf E and may be moved toward or away from the cutter-wheel C, as may be required by the varying projection of the cutter, being fastened in desired position by a set-screw $e'$, working in a slot $e$ of the bracket-shelf. This feed-table I provide with a vertical guide-plate F' on the side toward the center of the machine. The inner edge of the table, which is parallel with the rotating cutter and is set so as to clear the latter, bears against a movable flange or rim section D on the outer edge of the casing, which section moves in and out with the table, so as to always form a stop at the outer edge of the cutter-wheel to prevent the sidewise escape of cuttings. This flange is guided by the portion $d$, extending into the casing, and by a pin $d'$, projecting from it and passing through lugs $a^4$ $a^4$ on the casing-cover A², a spring $d^2$ being arranged so as to normally press the flange outward against the edge of the table F. As shown, it is arranged to be raised with the hinged cover A², which is locked to the fixed portion of the casing by means of the bolt $a^3$, engaging the slotted lug $a^2$.

The feed-table F, as described, may be used in the ordinary way to support the material operated upon, the latter being fed against the cutter-wheel by hand. For most purposes, however, this method of feeding is unsatisfactory, and I have therefore provided a special feed mechanism, which is pivoted to the outer edge of the feed-table F by means of a hinge-rod H, which passes through the table-lugs F² F² and engages the hinge-bosses $g^2$ and $g^3$ of the feed-frames G' and G, respectively, so as to permit the latter to be swung into lowered or raised position, as indicated in Fig. 2 by the full lines and dotted lines, respectively, the latter being the operative position.

The feed-frames G G' are similar in shape and are mounted in parallel position upon the hinge-rod H, to which one of them, G', is secured by means of a pin $g^4$, while the other, G, is loose upon the rod and is adapted to be adjustably secured when in operative position to the feed-table F by means of a set-screw $f^2$, which moves in a slot $f$ in the table, an enlargement $f'$ of said slot permitting the passage of the head of the screw. The frame G, with its feed-rolls, hereinafter described, may thus be set a greater or less distance from the center of the machine, so as to bring into action any desired portion of the cutter-wheel.

The two feed-frames G G' are rectangular in shape and have top and bottom bars or plates $g'$ and $g$, respectively, between which are located in each frame a series of feed-rolls J J J and J' J' J' on vertical shafts $j\,j\,j$, passing through the plates $g\,g'$. These feed-rolls are provided with teeth $j'$, and those in each frame are geared together so as to rotate in the same direction, being each provided with a gear-wheel $j^2$, arranged to mesh with intermediate wheels $j^3$.

The feed-frame G', as already described, is pinned to the hinge-rod H, which is provided with a spring $h$, adapted to normally move the frame G' toward the relatively-fixed frame G, and thereby grasp between the two parallel series of feed-rolls J J J and J' J' J' any vegetables or other suitable material for operating upon. In order that such material may be automatically held and fed on uniformly regardless of its size and shape, it is necessary that both series of rolls should be turned simultaneously in the same direction whether the frames G G' be spread apart a greater or less distance. This I accomplish as follows, as shown in the drawings: The series of rolls J' J' J' is operated directly from a shaft M, mounted in the frame G and provided with a handle M' and a toothed wheel $j^3$, arranged in gear with adjoining feed-rolls, so that the latter will all be rotated in the same direction, as indicated by the arrows. The second series of rolls J J J in the movable frame G' are operated indirectly from the shaft M through jointed arms N N' and $N^2\,N^3$, the outer ends of which are jointed together by means of a bolt or shaft L, which carries, as shown, a double sprocket-wheel $m'\,k'$. The other ends of these arms are carried one upon the shaft M in the gear-frame G, as shown at $n$, and the other upon the extended feed-roll shaft $j$ in the gear-frame G'. These shafts M and $j$ have secured to them sprocket-wheels $m$ and $k$, respectively, from which sprocket-chains (indicated by the dotted lines) extend to $m'\,k'$, so that by turning the shaft M rotary motion in one direction is imparted to every roll in both series of feed-rolls whether the frames G G' be brought close together or spread far apart. In order to permit lengthwise adjustment to suit the chain, the jointed arms are made in two telescopic parts N N' and $N^2\,N^3$, respectively, secured to each other, as shown at $n^5\,n^5$.

In addition to the hinge-rod H, upon which the feed-frames G G' are mounted, I provide also a guide-rod P diagonally therefrom, which is rigidly attached to the frame G and upon which the frame G' is free to slide. This rod P also serves to lock the feed mechanism to the flange F' of the feed-table when the feed mechanism is thrown up into operative position thereon, the frame G being then moved sufficiently to cause the end of the rod P to engage the hole $f^3$ in said flange.

By means of my improved feed mechanism, which, as stated, may be adapted for attachment to machines of varying detail construction, I am enabled by merely pushing upon the head $h'$ of the hinge-rod H to spread the two series of feed-rolls sufficiently to receive between them any ordinary size or shape of vegetable or other article, which upon releasing the hinge-rod to the action of the spring $h$ is closed upon by the feed-rolls. By then turning the feed-handle M' simultaneously with the rotation of the cutter-wheels, but at a relatively slow speed, the material is fed easily and uniformly against the cutter-wheels without handling the same, thus greatly increasing the capacity of the machine and the general satisfactoriness of the operation.

Having thus fully described my invention, I do not desire to limit myself to the exact construction shown; but

What I claim is—

1. The combination with a vegetable-cutter of a casing therefor having a feed-table adjustably secured thereto, and also having a relatively-movable rim-section D normally held in contact with said adjustable table, substantially as set forth.

2. The combination with a vegetable-cutter, of a feed-table adjustable toward and from the same, and the casing, having a separately-formed spring-pressed rim engaged with said table, substantially as described and for the purposes set forth.

3. The combination with a vegetable-cutter having a feed-table of a feed mechanism, comprising two relatively-adjustable feed-roll frames, hinged to said table and adapted to rest upon or to swing below the same, substantially as set forth.

4. The combination with a vegetable-cutter having a feed-table of a feed mechanism, comprising two relatively-adjustable feed-roll frames, hinged to said table and adapted to rest upon or to swing below the same, one of said frames being adjustably fixable to said table, substantially as set forth.

5. The combination with a vegetable-cutter having a feed-table, of a feed mechanism, hinged to said table by means of a transversely-movable hinge bolt or rod, said feed mechanism comprising two feed-roll frames, one of which is fixedly attached to said hinge-rod and the other loose thereon and adjustably fixable to said table, substantially as set forth.

6. In a vegetable-cutter, the combination with the cutting devices, of two frames carrying feed-rolls, both of said frames being pivoted to swing into and out of operative relation with said cutting devices, means for pressing one of said frames yieldingly toward the other frame, and mechanism carried by said frames for simultaneously rotating both rolls in various relative positions, substantially as described.

7. In a vegetable-cutter, the combination with the cutting devices, of a spring-pressed hinge-rod, a frame fixed thereon, a second frame loose on said rod, a series of feed-rolls for each of said frames, and mechanism for simultaneously rotating said feed-rolls in varying positions.

8. In a vegetable-cutter, the combination with the cutting devices, and the feed-table, of a feed mechanism, comprising a spring-pressed hinge-rod, a frame fixed thereon, a second frame loose on said rod, means for securing said second frame adjustably to the table, a series of feed-rolls in each of said frames, and mechanism for simultaneously rotating both rolls in varying positions.

9. The combination with the cutting devices, of relatively-adjustable feed-roll frames, pivotally mounted on a common axis to swing toward and from said cutting devices, and each having a series of geared-together feed-rolls, means for pressing one of said frames yieldingly toward the other, jointed rods pivotally mounted at their disconnected ends upon feed-roll shafts in the respective frames and carrying at their jointed ends toothed wheels operatively connected with said shafts, substantially as described.

10. In a vegetable-cutter, the combination of the opposing feed-rolls, one of which is journaled in a movable support therefor, a longitudinally-movable rod connected with said movable support and operating when pressure is applied to its free end to force said support and its roll away from the other roll, and a spring operating on said rod to hold said support and its roll yieldingly toward the other roll, substantially as shown and described.

11. In a vegetable-cutter, the combination with the pair of feed-roll frames, and the feed-rolls supported thereby, of the longitudinally-movable rod to which one of said frames is fixed and upon which the other frame is loose, and a spring acting upon said rod to hold one frame yieldingly toward the other frame, substantially as described, whereby pressure applied to the free end of said rod will force the frame fixed thereon and the rolls carried thereby away from the other frame and rolls, as specified.

12. In a vegetable-cutter, a feed mechanism comprising a pair of frames each having a series of geared-together feed-rolls, and one of said frames being movable relatively to the other, a fixed guide-rod P on which the movable frame is slidably mounted, a spring-pressed rod, supported to have longitudinal movement, connected to the movable frame, and mechanism to drive the feed-rolls simultaneously, substantially as described.

13. In a vegetable-cutter, a feed mechanism comprising a pair of frames each having a series of geared-together feed-rolls, and one of the frames being movable relatively to the other, a rod $N^2$ pivotally mounted on the shaft of one of the rolls in the movable frame, a main operating-shaft directly geared with the rolls in the other frame, a rod N pivoted at one end on the operating-shaft, a shaft L with which the other ends of the rods are pivotally connected, a pair of sprockets on the shaft L, a sprocket on each of the shafts to which the diverging ends of the rods are connected, and chains connecting the last-named sprockets, respectively, with the sprockets on the shaft L, substantially as described.

14. In a vegetable-cutter, the combination with the cutting-wheel, and the feed-table, of the feed-roll frames, and means for fixing the same adjustably on the table with relation to the cutting-wheel to cause any predetermined portion of the latter to operate, substantially as described.

15. In a vegetable-cutter, the combination with a cutting device, and a feed-table, of a feed mechanism comprising two frames, one of which is movable relatively to the other, means for securing said other frame adjustably to the table, means for pressing the movable frame yieldingly toward the stationary frame, and rotating feed-rolls in said frames, substantially as described.

16. In a vegetable-cutter, the combination with the cutter proper, and a feed-table, of a feed mechanism comprising a spring-pressed longitudinally-movable rod, a feed-frame secured thereto, a second feed-frame loose on said rod, means for securing said second frame adjustably to the table, and rotating feed-rolls in said frames, substantially as described.

In testimony whereof I affix my signature in presence of two witnesses.

JOHN F. ROTE.

Witnesses:
 W. G. STEWART,
 CAMERON E. STRAUSS.